(12) United States Patent
Li et al.

(10) Patent No.: US 11,394,444 B2
(45) Date of Patent: Jul. 19, 2022

(54) SIGNAL SENDING METHOD AND RELATED DEVICE

(71) Applicant: Huawei Technologies Co., Ltd., Shenzhen (CN)

(72) Inventors: Qi Li, Xi'an (CN); Huan Guo, Shanghai (CN); Hua Fan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 54 days.

(21) Appl. No.: 16/942,280

(22) Filed: Jul. 29, 2020

(65) Prior Publication Data
US 2020/0358508 A1  Nov. 12, 2020

Related U.S. Application Data

(63) Continuation of application No. PCT/CN2018/074546, filed on Jan. 30, 2018.

(51) Int. Cl.
*H04B 7/06* (2006.01)
*H04W 76/11* (2018.01)
(Continued)

(52) U.S. Cl.
CPC ......... *H04B 7/0626* (2013.01); *H04L 5/0051* (2013.01); *H04W 72/0446* (2013.01); *H04W 72/0453* (2013.01); *H04W 76/11* (2018.02)

(58) Field of Classification Search
CPC .... H04B 7/0626; H04B 7/024; H04B 7/0632; H04B 7/08; H04L 5/0051; H04W 76/11
See application file for complete search history.

(56) References Cited

U.S. PATENT DOCUMENTS

2014/0036796 A1* 2/2014 Etemad ............ H04W 16/18
                                                        370/329
2014/0161056 A1  6/2014 Moulsley et al.
(Continued)

FOREIGN PATENT DOCUMENTS

CN  102111879 B   7/2014
CN  104170271 A  11/2014
(Continued)

OTHER PUBLICATIONS

Dahlman et al., "Multi-Point Coordination and Transmission," 4G, LTE-Advanced Pro and The Road to 5G, total 16 pages (Jan. 2016).
(Continued)

*Primary Examiner* — Thai Nguyen
(74) *Attorney, Agent, or Firm* — Leydig, Voit & Mayer, Ltd.

(57) ABSTRACT

A method executed by a first base station in this application includes: determining target pilot ports and a coordinating cell of a target cell, where the coordinating cell is a cell that jointly sends, with the target cell, channel state information-reference signals CSI-RSs of the target cell, the target pilot ports are pilot ports used to jointly send the CSI-RSs of the target cell, and the target pilot ports include a pilot port of the target cell and a pilot port of the coordinating cell; determining a resource location of a target time-frequency resource, where the target time-frequency resource is a time-frequency resource used to send the CSI-RSs of the target cell; and sending the CSI-RSs of the target cell to a terminal based on the target time-frequency resource, where signal strength of the terminal is lower than a preset threshold.

10 Claims, 9 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 2015/0146561 A1* | 5/2015 | Jung | ............... | H04L 5/0094 370/252 |
| 2016/0150512 A1* | 5/2016 | Zhang | ............... | H04W 72/0446 370/329 |
| 2020/0036555 A1* | 1/2020 | Davydov | ............ | H04L 25/0224 |

FOREIGN PATENT DOCUMENTS

| | | | |
|---|---|---|---|
| CN | 104604283 | A | 5/2015 |
| CN | 104618985 | A | 5/2015 |
| CN | 104782061 | A | 7/2015 |
| CN | 104869649 | A | 8/2015 |
| CN | 105025527 | A | 11/2015 |
| CN | 105846950 | A | 8/2016 |
| CN | 105992367 | A | 10/2016 |
| CN | 106664192 | A | 5/2017 |
| CN | 107294583 | A | 10/2017 |
| CN | 105379374 | B | 5/2020 |
| JP | 2014027626 | A | 2/2014 |
| WO | 2015165356 | A1 | 11/2015 |
| WO | 2017196398 | A1 | 11/2017 |

OTHER PUBLICATIONS

Zhao et al., "Algorithm to reduce impact of LTE-A CSI-RS on LTE legacy UE in CoMP scenario," 2015 International Conference on Wireless Communications and Signal Processing (WCSP), total 5 pages, Institute of Electrical and Electronics Engineers, New York, New York (Oct. 15-17, 2015).

* cited by examiner

SIGNAL SENDING METHOD AND RELATED DEVICE

CROSS-REFERENCE TO RELATED APPLICATIONS

This application is a continuation of International Patent Application No. PCT/CN2018/074546, filed on Jan. 30, 2018, the disclosure of which is hereby incorporated by reference in its entirety.

TECHNICAL FIELD

Embodiments of this application relate to the field of wireless communications technologies, and in particular, to a signal sending method and a related device.

BACKGROUND

Currently, a user terminal located in a common radiation area of different cells is referred to as an edge user terminal, or referred to as an edge user. On the one hand, because the edge user is located at an edge position of a serving cell, a loss of a signal in a propagation process, namely, a path loss, is relatively large, and strength of a downlink signal is relatively weak. On the other hand, because the edge user is located in an overlapping service scope of the different cells, the downlink signal is easily interfered by a signal from another cell. Consequently, a signal to interference plus noise ratio (SINR) of the downlink signal of the edge user is relatively low, and a user rate of the edge user is lower than a user rate of another non-edge user in the serving cell.

Therefore, a transmission mode TM10 technology is introduced to implement joint transmission by a plurality of cells, to improve a transmit rate of the user. A target cell, cell 0, and a coordinating cell, cell 1, each send a channel state information-reference signal (CSI-RS) to an edge user that supports TM10, to perform channel state measurement, and the edge user feeds back, to the cell 0, channel state information (CSI) of each of the cell 0 and the cell 1 that is obtained through measurement. After the cell 0 receives the channel state information of each of the two cells, the cell 0 instructs the cell 1 to jointly send a traffic channel, and notifies the cell 1 of service information and the CSI of the cell 1. Finally, the cell 0 and the cell 1 send, to the edge user, traffic channels, namely, physical downlink shared channels (PDSCH), that carry same service information, and the cell 0 separately sends a traffic control channel to the edge user, to assist the edge user in decoding the two traffic channels. The traffic control channel is a physical downlink control channel (PDCCH).

In the foregoing TM10-based joint transmission manner, because the target cell cell 0 and the coordinating cell cell 1 each measure respective channel state information and each deliver a PDSCH, traffic channels sent by the two cells are incoherent. After receiving the two PDSCHs, the edge user separately decodes the two PDSCHs, to obtain the service information. Consequently, the foregoing TM10-based joint transmission manner can implement only incoherent transmission.

SUMMARY

This application provides a signal sending method and a related device, to implement coherent joint transmission by cells and improve downlink data signal strength of a terminal device.

According to a first aspect of this application, a signal sending method is provided. The method includes:
determining, by a first base station, target pilot ports used to send channel state information-reference signals CSI-RSs of a target cell and a coordinating cell of the target cell, where the coordinating cell is a cell that sends, for the target cell, a CSI-RS of the target cell, the target pilot ports include a pilot port of the target cell and a pilot port of the coordinating cell, and the coordinating cell may be one cell or may be a plurality of cells;

determining, by the first base station, a location of a time-frequency resource used by the target cell to jointly send the CSI-RSs, namely, a target time-frequency resource location, where the target time-frequency resource location indicates the time-frequency resource for sending the CSI-RSs of the target cell; and finally sending, by the first base station on the target pilot ports, the CSI-RSs of the target cell to a terminal based on the target time-frequency resource location, where signal strength of the terminal is lower than a preset threshold, and the terminal is located at a position at which signal strength is relatively weak due to a factor such as a relatively long distance from the base station or blocking by another channel.

Optionally, the first base station may determine a neighboring cell of the target cell as a coordinating cell of the target cell; or during a specific period, the first base station collects an A3 measurement report of the terminal in the target cell, and selects one or more cells as coordinating cells, where a quantity of A3 measurement reports sent by the one or more cells exceeds a threshold.

It can be learned from the foregoing technical solution that the signal sending method in this application has the following advantages:

Because the target pilot ports include the pilot port of the target cell and the pilot port of the coordinating cell, the CSI-RSs of the target cell are sent by the target cell and the coordinating cell. Time-frequency resources used for joint transmission are the same, and are both the time-frequency resource indicated by the time-frequency resource location of the target cell. In other words, the CSI-RSs of the target cell are jointly delivered by the target cell and the coordinating cell, to implement coherent joint transmission of the target cell and the coordinating cell, so that CSI of the target cell that is obtained by the terminal through measurement is more accurate, the target cell can obtain a larger gain when sending downlink data, and downlink data signal strength of the terminal is improved.

With reference to the first aspect of this application, in a first implementation of the first aspect of this application, the determining, by the first base station, a target time-frequency resource location includes:
when the first base station obtains a cell identifier of the target cell, determining, by the first base station, a CSI-RS configuration index of the target cell based on the cell identifier, where the CSI-RS configuration index indicates the location of the time-frequency resource used to transmit the CSI-RSs; and after the determining, by the first base station, the CSI-RS configuration index of the target cell based on the cell identifier of the target cell, the method further includes:
sending, by the first base station, CSI-RS configuration information to the terminal, where the CSI-RS configuration information is used to: configure a non-zero transmit power CSI-RS configuration index of the terminal as the CSI-RS configuration index of the target cell, and configure a zero transmit power CSI-RS configuration index of the terminal as an index indicating following CSI-RS resource elements (RE): 1. an RE of a non-zero power CSI-RS of the terminal; 2. an RE of a CSI-RS jointly delivered by the target cell for another target cell by using the target cell as a coordinating cell of the another target cell; and 3. an RE of a CSI-RS jointly delivered by the coordinating cell for another target cell.

Optionally, the first base station configures a total quantity of non-zero transmit power CSI-RS ports of the terminal to be equal to a total quantity of the target pilot ports. For example, if the total quantity of the target pilot ports is 8, the total quantity of non-zero transmit power CSI-RS ports of the terminal is also 8.

In the first possible implementation, on the one hand, CSI-RS configuration of the terminal may enable the terminal to perform channel estimation on the target cell based on the CSI-RSs of the target cell; on the other hand, when the target cell and the coordinating cell are updated, the CSI-RS configuration of the terminal does not need to be reconfigured, and update efficiency is improved.

With reference to the first aspect of this application or the first possible implementation of the first aspect, in a second possible implementation of the first aspect, the coordinating cell is a cell covered by the first base station, and a total quantity of the target pilot ports is S, where a quantity of pilot ports of the target cell is A, a quantity of pilot ports of the coordinating cell is (S-A), S is a positive integer not less than 2, and A is a positive integer not less than 1 and less than S; and that the sending, by the first base station on the target pilot ports, the CSI-RSs of the target cell to a terminal based on the target time-frequency resource location includes:

sending, by the first base station on the A pilot ports of the target cell and the (S-A) pilot ports of the coordinating cell, the CSI-RSs of the target cell to the terminal based on the time-frequency resource indicated by the time-frequency resource location.

With reference to the first aspect of this application or the first possible implementation of the first aspect, in a third possible implementation of the first aspect, the coordinating cell is a cell covered by a second base station, the second base station is a base station whose coverage overlaps coverage of the first base station, and a total quantity of the target pilot ports is S, where a quantity of pilot ports of the coordinating cell is (S-A), S is a positive integer not less than 2, and A is a positive integer not less than 1 and less than S;

before the sending, by the first base station on the target pilot ports, the CSI-RSs of the target cell to a terminal based on the target time-frequency resource location, the method further includes:

sending, by the first base station, a first notification message to the second base station, where the first notification message carries a cell identifier of the coordinating cell, so that the second base station sends, on the (S-A) pilot ports of the coordinating cell, the CSI-RS of the target cell to the terminal based on the time-frequency resource indicated by the target time-frequency resource location; and the sending, by the first base station on the target pilot ports, the CSI-RSs of the target cell to a terminal based on the target time-frequency resource location includes:

when the coordinating cell is a cell in the second base station, sending, by the first base station on the A pilot ports of the target cell, the CSI-RS of the target cell to the terminal based on the time-frequency resource indicated by the target time-frequency resource location.

With reference to the second possible implementation of the first aspect of this application, in a fourth possible implementation of the first aspect, after the sending, by the first base station on the A pilot ports of the target cell and the (S-A) pilot ports of the coordinating cell, the CSI-RSs of the target cell to the terminal based on the time-frequency resource indicated by the target time-frequency resource location, the method further includes:

receiving, by the first base station, channel state information CSI of the target cell that is sent by the terminal; and sending, by the first base station on S data ports, downlink data signals of the target cell to the terminal based on the CSI of the target cell, where A data ports of the S data ports have a one-to-one correspondence with the A pilot ports of the target cell, (S-A) data ports of the S data ports have a one-to-one correspondence with the (S-A) pilot ports of the coordinating cell, and a data port and a corresponding pilot port correspond to a same physical antenna.

Optionally, the first base station adds the downlink data signals of the target cell to PDSCHs, and sends the PDSCHs to the terminal by using the S data ports. In addition, the first base station further delivers a PDCCH to the terminal, so that the terminal demodulates the PDSCHs, to obtain the downlink data of the target cell.

With reference to the third possible implementation of the first aspect of this application, in a fifth possible implementation of the first aspect, after the sending, by the first base station on the A pilot ports of the target cell, the CSI-RS of the target cell to the terminal based on the time-frequency resource indicated by the target time-frequency resource location, the method further includes:

receiving, by the first base station, channel state information CSI of the target cell that is sent by the terminal;

sending, by the first base station, a second notification message to the second base station, where the second notification message carries the CSI of the target cell and a downlink data signal of the target cell, so that the second base station sends, on (S-A) data ports, the downlink data signal of the target cell to the terminal based on the CSI of the target cell, where the (S-A) data ports have a one-to-one correspondence with the (S-A) pilot ports of the coordinating cell; and sending, by the first base station on A data ports, a downlink data signal of the target cell to the terminal based on the CSI of the target cell, where the A data ports have a one-to-one one correspondence with the A pilot ports of the target cell, and a data port and a corresponding pilot port correspond to a same physical antenna.

Optionally, the first base station adds the downlink data signals of the target cell to PDSCHs, and sends the PDSCHs to the terminal. In addition, the first base station further delivers a PDCCH to the terminal, so that the terminal demodulates the PDSCHs, to obtain the downlink data of the target cell.

In the foregoing two implementations, the target cell and the coordinating cell jointly deliver the downlink data signals, so that phases of the signals arriving at the terminal are the same. The signals may be superimposed with each other, to increase signal strength of the downlink signals and improve signal transmission efficiency.

A second aspect of this application provides a signal sending method. The method includes:

receiving, by a second base station, a first notification message sent by a first base station, where the first notification message carries a cell identifier of a coordinating cell, and the first base station is a base station whose coverage overlaps coverage of the second base station;

determining, by the second base station, a target time-frequency resource location and a pilot port of the coordinating cell based on the cell identifier of the coordinating cell, where the target time-frequency resource location is a time-frequency resource location of a channel state information-reference signal CSI-RS of a target cell, the target cell is a cell covered by the first base station, a quantity of pilot ports of the coordinating cell is (S-A), S is a positive integer not less than 2, and A is a positive integer not less than 1 and less than S; and sending, by the second base station on the (S-A) pilot ports of the coordinating cell, the CSI-RS of the target cell to a terminal based on the target time-frequency resource location, where signal strength of the terminal is lower than a preset threshold.

It can be learned from the foregoing technical solution that the signal sending method in this application has the following advantages:

The second base station jointly sends the CSI-RS of the target cell on the pilot port of the coordinating cell, so that the terminal can more accurately measure and obtain CSI of the target cell based on the CSI-RS of the target cell that is jointly delivered by the first base station and the second base station, and therefore, a larger transmission gain is obtained, and downlink data signal strength of the terminal is improved. With reference to the second aspect of this application, in a first implementation of the second aspect of this application, after the sending, by the second base station on the (S-A) pilot ports of the coordinating cell, the CSI-RS of the target cell to a terminal based on the target time-frequency resource location, the method further includes:

receiving, by the second base station, a second notification message sent by the first base station, where the second notification message carries channel state information CSI of the target cell and a downlink data signal of the target cell; and sending, by the second base station on (S-A) data ports, the downlink data signal of the target cell to the terminal based on the CSI of the target cell, where the (S-A) data ports have a one-to-one correspondence with the (S-A) pilot ports of the coordinating cell, and a data port and a corresponding pilot port correspond to a same physical antenna.

In the foregoing downlink data signal sending method, when downlink data signals sent by the first base station and the second base station to the terminal arrive at the terminal, phases of the signals are the same, and the signals may be superimposed with each other, to increase signal strength of the downlink data signals and improve signal transmission efficiency.

A third aspect of this application provides a signal sending method. The method includes:

receiving, by a terminal, channel state information-reference signals CSI-RSs of a target cell, where the CSI-RSs of the target cell are sent on target pilot ports based on a target time-frequency resource location, the target time-frequency resource location is a time-frequency resource location of the CSI-RSs of the target cell, the target pilot ports are pilot ports used to jointly send the CSI-RSs of the target cell, the target pilot ports include a pilot port of the target cell and a pilot port of a coordinating cell, and the coordinating cell is a cell that jointly sends, with the target cell, the CSI-RSs of the target cell;

performing, by the terminal, channel measurement based on the CSI-RSs of the target cell, to obtain channel state information CSI of the target cell; and sending, by the terminal, the CSI of the target cell to a first base station.

It can be learned from the foregoing technical solution that the signal sending method in this application has the following advantages:

The CSI-RSs of the target cell are jointly delivered by the target cell and the coordinating cell, to implement coherent joint transmission of the target cell and the coordinating cell, so that the CSI of the target cell that is obtained by the terminal through measurement is more accurate, the target cell can obtain a larger gain when sending downlink data, and downlink data signal strength of the terminal is improved.

With reference to the third aspect of this application, in a first possible implementation of the third aspect of this application, before the receiving, by a terminal, channel state information-reference signals CSI-RSs of a target cell, the method further includes:

receiving, by the terminal, CSI-RS configuration information sent by the first base station, where the terminal is a terminal whose signal quality strength is lower than a preset threshold, and the CSI-RS configuration information is used to indicate: a non-zero power channel state information-reference signal CSI-RS configuration index of the terminal is a CSI-RS configuration index of the target cell, where the CSI-RS configuration index of the target cell is used to determine a target time-frequency resource, and the CSI-RS configuration index of the target cell is determined based on a cell identifier of the target cell; and a zero power CSI-RS configuration index of the terminal is an index indicating following CSI-RS resource elements (RE): 1. an RE of a non-zero power CSI-RS of the terminal, 2. an RE of a CSI-RS jointly delivered by the target cell for another target cell by using the target cell as a coordinating cell of the another target cell, and 3. an RE of a CSI-RS jointly delivered by the coordinating cell for another target cell.

In this implementation, on the one hand, CSI-RS configuration of the terminal may enable the terminal to perform channel estimation on the target cell based on the CSI-RSs of the target cell; on the other hand, when the target cell and the coordinating cell are updated, CSI-RS configuration of the terminal does not need to be reconfigured, and update efficiency is improved.

According to a fourth aspect, an embodiment of this application provides a base station. The base station has a function of implementing behavior of the base station in the foregoing method embodiments. The function may be implemented by hardware, or may be implemented by hardware executing corresponding software. The hardware or the software includes one or more modules corresponding to the foregoing function.

According to a fifth aspect, an embodiment of this application provides a base station. The base station includes a processor, a memory, a bus, a transmitter, and a receiver. The memory is configured to store a computer executable instruction, the processor and the memory are connected by using the bus, and when the base station runs, the processor executes the computer executable instruction stored in the memory, so that the base station is enabled to perform the signal sending method according to any one of the first aspect or the possible implementations of the first aspect.

According to a sixth aspect, an embodiment of this application provides a computer-readable storage medium. The computer-readable storage medium is configured to store a computer software instruction used by the foregoing base station, and when the computer software instruction is run on a computer, the computer is enabled to perform the signal sending method according to any one of the first aspect or the possible implementations of the first aspect.

According to a seventh aspect, an embodiment of this application provides a computer program product including an instruction. When the computer program product is run on a computer, the computer is enabled to perform the signal sending method according to any one of first aspect or the possible implementations of the first aspect.

In addition, for technical effects of any design manner in the fourth aspect to the seventh aspect, refer to technical effects of different design manners in the first aspect. Details are not described herein again.

According to an eighth aspect, an embodiment of this application provides a base station. The base station has a function of implementing behavior of the base station in the foregoing method embodiments. The function may be implemented by hardware, or may be implemented by hardware executing corresponding software. The hardware or the software includes one or more modules corresponding to the foregoing function.

According to a ninth aspect, an embodiment of this application provides a base station. The base station includes a processor, a memory, a bus, a transmitter, and a receiver. The memory is configured to store a computer executable instruction, the processor and the memory are connected by using the bus, and when the base station runs, the processor executes the computer executable instruction stored in the memory, so that the base station is enabled to perform the signal sending method according to any one of the second aspect or the possible implementations of the second aspect.

According to a tenth aspect, an embodiment of this application provides a computer-readable storage medium. The computer-readable storage medium is configured to store a computer software instruction used by the foregoing base station, and when the computer software instruction is run on a computer, the computer is enabled to perform the signal sending method according to any one of the second aspect or the possible implementations of the second aspect.

According to an eleventh aspect, an embodiment of this application provides a computer program product including an instruction. When the computer program product is run on a computer, the computer is enabled to perform the signal sending method according to any one of the second aspect or the possible implementations of the second aspect.

In addition, for technical effects of any design manner in the eighth aspect to the eleventh aspect, refer to technical effects of different design manners in the second aspect. Details are not described herein again.

According to a twelfth aspect, an embodiment of this application provides a terminal. The terminal has a function of implementing behavior of the terminal in the foregoing method embodiments. The function may be implemented by hardware, or may be implemented by hardware executing corresponding software. The hardware or the software includes one or more modules corresponding to the foregoing function.

According to a thirteenth aspect, an embodiment of this application provides a terminal. The terminal includes a processor, a memory, a bus, a transmitter, and a receiver. The memory is configured to store a computer executable instruction, the processor and the memory are connected by using the bus, and when the terminal runs, the processor executes the computer executable instruction stored in the memory, so that the terminal is enabled to perform the signal sending method according to any one of the third aspect or the possible implementations of the third aspect.

According to a fourteenth aspect, an embodiment of this application provides a computer-readable storage medium. The computer-readable storage medium is configured to store a computer software instruction used by the foregoing terminal, and when the computer software instruction is run on a computer, the computer is enabled to perform the signal sending method according to any one of the third aspect or the possible implementations of the third aspect.

According to a fifteenth aspect, an embodiment of this application provides a computer program product including an instruction. When the computer program product is run on a computer, the computer is enabled to perform the signal sending method according to any one of the third aspect or the possible implementations of the third aspect.

In addition, for technical effects of any design manner in the twelfth aspect to the fifteenth aspect, refer to technical effects of different design manners in the third aspect. Details are not described herein again.

According to a sixteenth aspect, an embodiment of this application provides a communications apparatus. The communications apparatus includes a processing element and a storage element, the storage element is configured to store a computer program, and when the processing element invokes the computer program, the communications apparatus is configured to perform the signal sending method according to any one of the first aspect, the second aspect, the third aspect, and their possible implementations.

DESCRIPTION OF EMBODIMENTS

This application provides a signal sending method and a related device, to implement coherent joint transmission by cells and improve downlink data signal strength of a terminal device. The following clearly and describes the technical solutions in this application with reference to the accompanying drawings in this application. Clearly, the described embodiments are merely some but not all of the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. In addition, the terms "include", "contain" and any other variants mean to cover the non-exclusive inclusion, for example, a process, method, system, product, or device that includes a series of steps or units is not necessarily limited to those steps or units, but may include other steps or units not expressly listed or inherent to such a process, method, system, product, or device.

The signal sending method in this application is applied to wireless communications systems, for example, a global system for mobile communications (GSM), a code division multiple access (CDMA) system, a wideband code division multiple access (WCDMA) system, a general packet radio service (GPRS) system, a universal mobile telecommunications system (UMTS), a long term evolution (LTE) system, and a subsequent evolved system of the LTE system, such as a new generation wireless communications system (new generation, NR).

In this application, a base station may be an evolved NodeB (evolutional NodeB, eNB or eNodeB for short), a macro base station, a micro base station (also referred to as a "small cell"), a picocell base station, an access point (AP), a transmission point (TP), a gNodeB (new generation NodeB), or the like in a long term evolution (LTE) system or a licensed-assisted access using LTE (authorized auxiliary access long-term evolution (LAA-LTE)) system.

A cell mentioned in this application may be a cell corresponding to the base station. The cell may belong to a macro base station, or may belong to a small base station or a micro base station corresponding to a small cell. The small cell herein may include a metro cell, a micro cell, a pico cell, a femto cell, or the like. These small cells are characterized by a small coverage and low transmit power, and are applicable to providing a high-rate data transmission service.

Figure 1A:
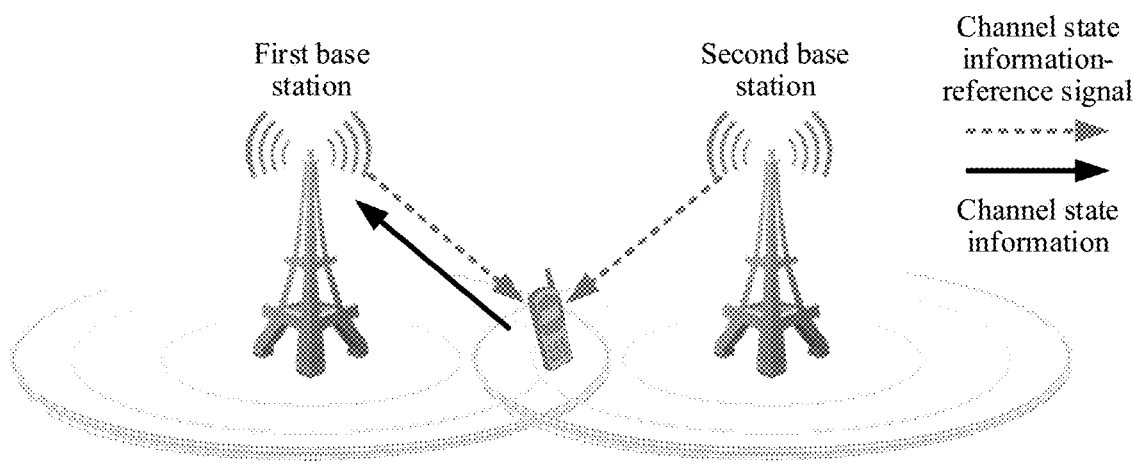
FIG. 1(a) is a schematic diagram of a system framework of a signal sending method according to an embodiment of this application.
Figure 1B:
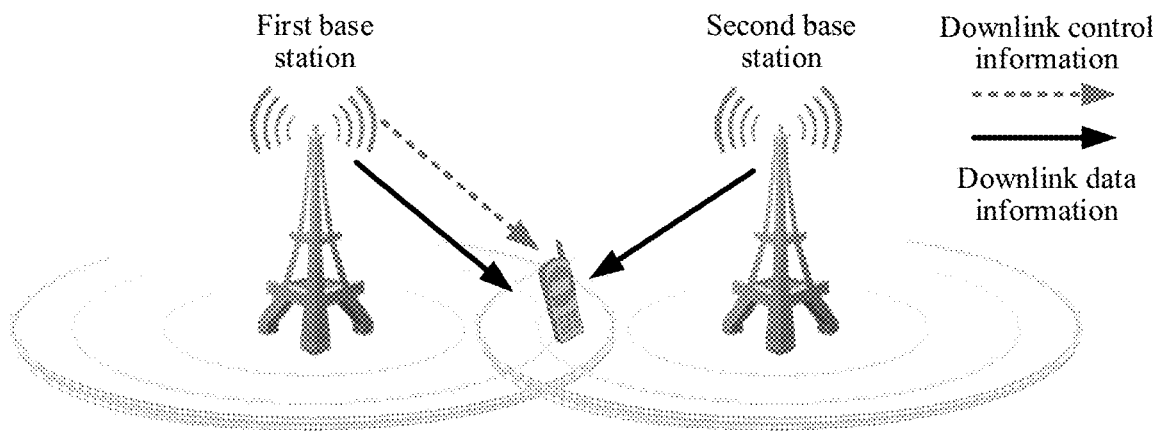
FIG. 1(b) is a schematic diagram of another system framework of a signal sending method according to an embodiment of this application.

A terminal refers to a terminal device, and may also be referred to as user equipment (UE), a mobile station (MS), a mobile terminal, an intelligent terminal, or the like. The terminal may communicate with one or more core networks by using a radio access network (RAN). For example, the terminal may be a mobile phone (or referred to as a "cellular" phone), a computer with a mobile terminal, or the like. The terminal may be a portable, pocket-size, handheld, computer built-in or vehicle-mounted mobile apparatus, or a terminal in the 5G network, and these mobile apparatuses and the terminal exchange voice and/or data with a radio access network. Description for the terminal: In the present invention, the terminal may further include a relay, and any device that can perform data communication with the base station may be considered as a terminal. FIG. 1(*a*) is a schematic diagram of a system framework of a signal sending method according to this application. The system framework includes a first base station, a second base station, and a terminal.

FIG. 1(*a*) shows an application scenario of the signal sending method according to this application. As shown in the figure, a target cell accessed by the terminal is within coverage of the first base station, a coordinating cell of the target cell is within coverage of the second base station, and the coverage of the first base station overlaps with the coverage of the second base station. Typical coverage with weak signal strength is overlapping coverage of the first base station and the second base station, and the weak signal strength may be caused by the following two factors: 1. Coverage of a base station is radiated from a center of the base station to outside, and consequently, overlapping coverage between base stations is far away from the base station; and 2. Overlapping coverage is covered by two or more base stations, and weak signal strength is caused by mutual interference between signals of the base stations. To enhance signal strength of the terminal in the overlapping coverage, when the first base station and the terminal perform data transmission, the first base station and the second base station coordinate to jointly send channel state information-reference signals, and the terminal measures and feeds back channel state information to the first base station, to perform joint transmission of downlink data information between the first base station and the second base station. A specific schematic diagram of the sending is shown in FIG. 1(*b*). The first base station sends downlink control information and downlink data information to the terminal, and the second base station sends downlink data information to the terminal.

In addition, FIG. 1(*a*) and FIG. 1(*b*) show a case in which the terminal with weak signal strength is located in an overlapping service area of the first base station and the second base station. The terminal may alternatively be located at another position with relatively weak signal strength, for example, in an edge area between two cells that are in coverage of a same base station. In this application, the coordinating cell may be one or more cells, and the terminal is within coverage of the one or more cells.

To facilitate understanding of the signal sending method in the embodiments of this application, the signal sending method in this application may be understood as a method for coordinately sending downlink data signals between cells, and an objective thereof is to improve signal strength of a terminal with relatively weak signal strength. The terminal with relatively weak signal strength is briefly referred to as a terminal in the following embodiments, and the following describes in detail the signal sending method in this application with reference to specific embodiments.

In this application, the target cell is a serving cell of the terminal, and the terminal is a terminal with relatively weak signal strength in signal coverage of the target cell. To improve the signal strength of the terminal, the target cell and the coordinating cell perform joint transmission, to improve received signal strength of the terminal.

Figure 2:
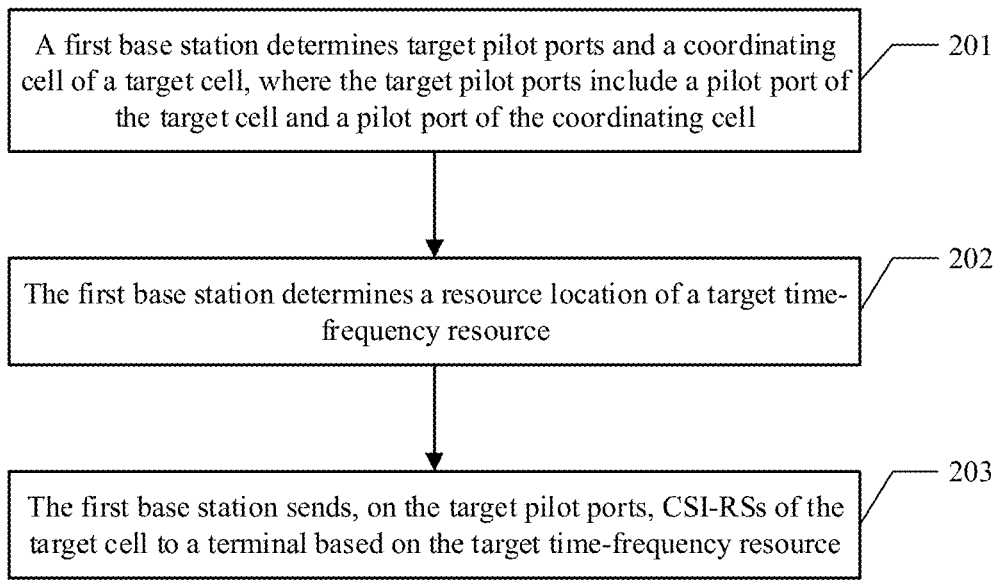
FIG. 2 is a schematic diagram of an embodiment of a signal sending method according to an embodiment of this application.

As shown in FIG. 2, an embodiment of the signal sending method according to an embodiment of this application includes the following steps.

201: A first base station determines target pilot ports and a coordinating cell of a target cell, where the target pilot ports include a pilot port of the target cell and a pilot port of the coordinating cell.

The target cell is a serving cell that provides a service for a terminal, and the coordinating cell is a cell that performs, with the target cell, joint transmission to the terminal. The first base station may periodically collect information about an A3 measurement report received by the first base station or another base station, and select, as coordinating cells, one or more cells that send a relatively large quantity of A3 measurement reports.

202: The first base station determines a resource location of a target time-frequency resource.

Optionally, the first base station first obtains a cell identifier of the target cell, then the first base station determines a CSI-RS configuration index of the target cell based on the cell identifier of the target cell, and finally, the first base station determines the resource location of the target time-frequency resource based on the CSI-RS configuration index of the target cell, to determine the target time-frequency resource.

In the foregoing optional implementation in which the first base station determines the target time-frequency resource, after the first base station determines the CSI-RS configuration index of the target cell based on the cell identifier of the target cell, the first base station may further perform the following operation:

The first base station sends CSI-RS configuration information to the terminal, where the CSI-RS configuration information is used to indicate: a non-zero power CSI-RS configuration index of the terminal is the CSI-RS configuration index of the target cell, and a zero power CSI-RS configuration index of the terminal is an index indicating following three types of CSI-RS resource elements REs: an RE of a non-zero power CSI-RS of the terminal, an RE of a CSI-RS jointly delivered by the target cell for another target cell, and an RE of a CSI-RS jointly delivered by the coordinating cell for another target cell.

The non-zero power CSI-RS configuration index and the zero power CSI-RS configuration index of the terminal are configured in the foregoing configuration manner. The first base station configures the non-zero power CSI-RS configuration index of the terminal as the CSI-RS configuration index of the target cell, so that the terminal can perform channel estimation only on a CSI-RS signal carried on the target time-frequency resource. In addition, the first base station configures the zero power CSI-RS configuration index of the terminal as the foregoing three types of indexes, so that when the target cell is updated, for example, is updated to the foregoing another target cell, the non-zero power CSI-RS configuration index of the terminal does not need to be reconfigured, and update efficiency is improved.

203: The first base station sends, on the target pilot ports, CSI-RSs of the target cell to the terminal based on the target time-frequency resource.

The first base station adds the CSI-RSs of the target cell to the target time-frequency resource, and sends the CSI-RSs of the target cell to the terminal by using the target pilot ports. The terminal is a terminal whose signal quality strength is lower than a preset threshold.

The coordinating cell determined in step 201 may be a cell covered by the first base station, for example, a neighboring cell of the target cell, or may be a cell covered by a second base station. The target pilot ports include both the pilot port of the target cell and the pilot port of the coordinating cell. Therefore, it is easily known that when the coordinating cell is covered by the first base station, the first base station may send a signal by using the pilot port of the target cell, and may send a signal by using the pilot port of the coordinating cell. However, when the coordinating cell is covered by the second base station, the first base station cannot send a signal by using the pilot port of the coordinating cell. In this case, the second base station needs to coordinate with the first base station to perform joint transmission.

For details of specific implementations of the foregoing two cases, refer to related descriptions of embodiments corresponding to FIG. 3(a) and FIG. 4(a) in the following, and the details are not described herein again.

In this embodiment, because the target pilot ports include both the pilot port of the target cell and the pilot port of the coordinating cell, the CSI-RSs of the target cell are jointly sent by the target cell and the coordinating cell, and resource locations of time-frequency resources used for joint transmission are the same, in other words, the resource locations each are the resource location of the target time-frequency resource corresponding to the target cell. It is easy to understand that, for the terminal, the CSI-RSs of the target cell that are received by the terminal are the CSI-RSs of the target cell and are jointly delivered by the target cell and the coordinating cell by using a same time-frequency resource (namely, coherent joint transmission). Therefore, according to the signal sending method in this embodiment, the coherent joint transmission by the target cell and the coordinating cell may be implemented, so that phases of two signals (namely, signals separately corresponding to the target cell and the coordinating cell) received by the terminal may be superimposed on each other, to increase signal strength of the CSI-RSs received by the terminal, so that CSI of the target cell that is obtained by the terminal through measurement is more accurate, the target cell can obtain a larger gain when sending downlink data, and downlink data signal strength of the terminal is improved.

The following describes in detail the signal sending method in this application with reference to two cases in which the coordinating cell and the target cell each belong to coverage of a same base station, and the coordinating cell and the target cell belong to coverage of different base stations. Details are as follows:

1. The target cell is within the coverage of the first base station, and the coordinating cell is within the coverage of the second base station.

Figure 3A:
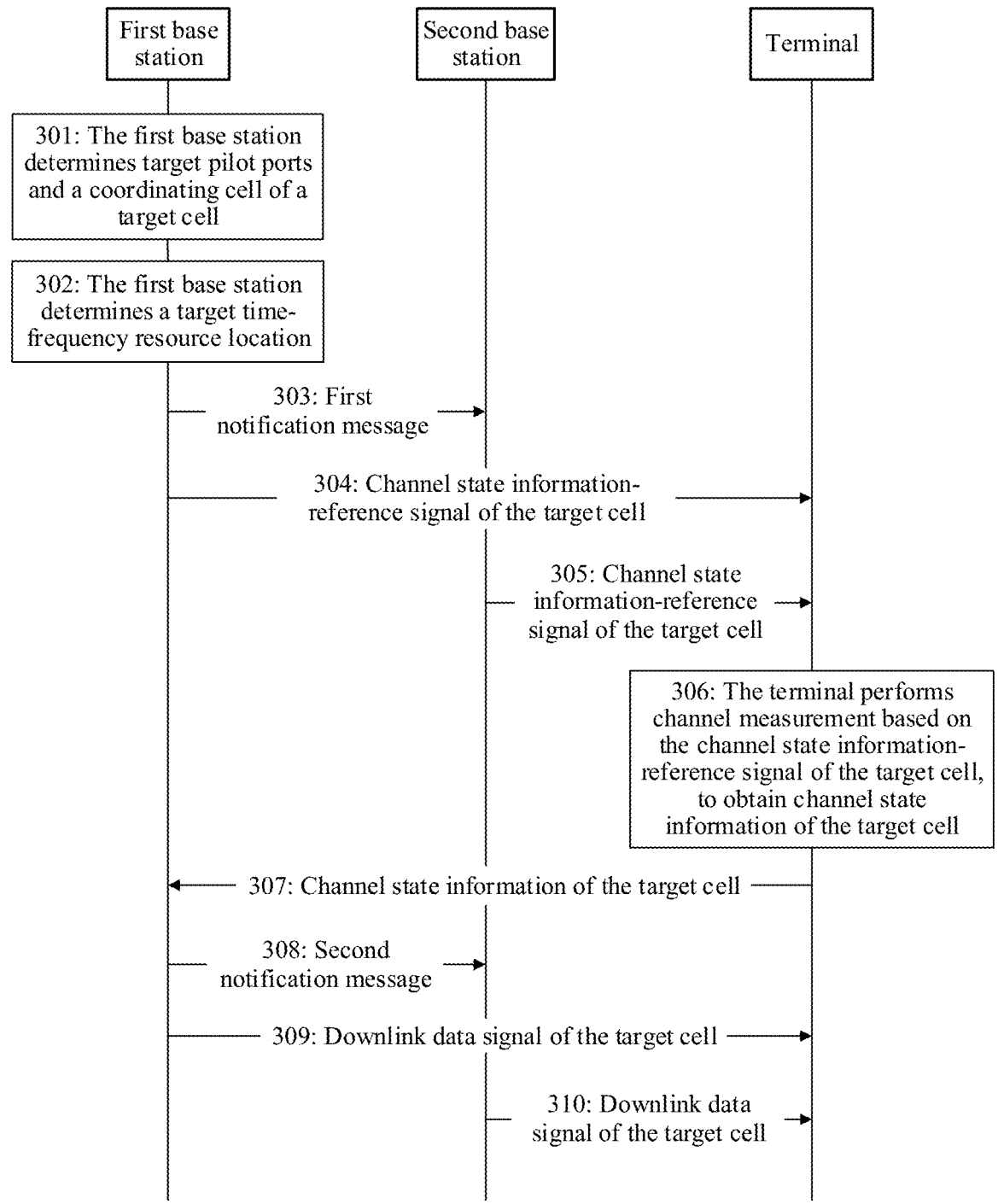
FIG. 3(a) is a schematic diagram of another embodiment of a signal sending method according to an embodiment of this application.

As shown in FIG. 3(a), another embodiment of a signal sending method according to an embodiment of this application includes the following steps.

301: A first base station determines target pilot ports and a coordinating cell of a target cell.

The first base station determines the target pilot ports used for joint transmission by the target cell and the coordinating cell, the target pilot ports include a pilot port of the target cell and a pilot port of the coordinating cell, and the target cell is a cell covered by the first base station.

The first base station determines the coordinating cell of the target cell, and a specific determining manner is: The first base station determines a second base station whose coverage overlaps with coverage of the first base station, and the first base station periodically collects an A3 measurement report received by the second base station, and uses, as coordinating cells, one or more cells that are covered by the second base station and that send a relatively large quantity of A3 measurement reports.

A total quantity of the target pilot ports is S, and the S target pilot ports include A pilot ports of the target cell and (S-A) pilot ports of the coordinating cell, S is a positive integer not less than 2, a typical value of S is 8, 16, or 32, and A is a positive integer not less than 1 and less than S.

302: The first base station determines a target time-frequency resource location.

The first base station determines a target time-frequency resource, where the target time-frequency resource is a time-frequency resource that is corresponding to the target cell and that is used to jointly send channel state information-reference signals CSI-RSs of the target cell, and is also referred to as a time-frequency resource of the target cell.

Optionally, the first base station determines a channel state information-reference signal configuration index CSI-RS configuration index of the target cell based on a cell identifier of the target cell. The CSI-RS configuration index is used to determine a frequency domain/time domain position for transmitting the CSI-RS, and a specific manner of determining the CSI-RS configuration index of the target cell may use (CellID mod N) as an index to determine the CSI-RS configuration index one by one, where N is an integer, and a typical value of N is 3 or 6. Alternatively, a fixed value may be used as an index to determine the CSI-RS configuration index of the target cell.

Optionally, after the CSI-RS configuration index of the target cell is determined, the first base station configures a CSI-RS of the terminal: The first base station sends CSI-RS configuration information to the terminal, and performs the following configuration on the terminal: 1. configuring a non-zero power (NZP) CSI-RS configuration index of the terminal as the CSI-RS configuration index of the target cell; 2. configuring a quantity of non-zero power CSI-RS ports of the terminal to S, namely, a total quantity of pilot ports of the target cell and the coordinating cell; and 3. configuring a zero power (ZP) CSI-RS configuration index of the terminal as an index indicating following CSI-RS resource elements (RE): 1. an RE of a non-zero power CSI-RS of the terminal; 2. an RE of a CSI-RS jointly delivered by the target cell for another target cell by using the target cell as a coordinating cell of the another target cell; and 3. an RE of a CSI-RS jointly delivered by the coordinating cell for another target cell.

303: The first base station sends a first notification message to the second base station.

After determining the time-frequency resource location of the target cell, the first base station sends the first notification message to the second base station. The first notification message carries a cell identifier of the coordinating cell, so that the second base station sends, on the (S-A) pilot ports of the coordinating cell, the CSI-RS of the target cell to the terminal based on the time-frequency resource indicated by the time-frequency resource location of the target cell.

304: The first base station sends, on the pilot port of the target cell, the channel state information-reference signal of the target cell to the terminal based on the target time-frequency resource location.

The first base station sends, to the terminal on the A pilot ports of the target cell, the CSI-RS in the target time-frequency resource of the target cell, namely, the CSI-RS of the target cell. The target time-frequency resource location is indicated by the CSI-RS configuration index of the target cell.

Optionally, before step 304, the method further includes: The first base station determines the terminal. A specific determining method may be: The first base station selects a terminal in an overlapping service area between the target cell of the first base station and the coordinating cell of the second base station as the terminal. It is easily known that when signal strength of the current serving cell of the terminal decreases to a specific threshold, the terminal actively sends an A3 measurement report to the base station, and therefore, the A3 measurement report may be used as a basis for selecting a terminal with poor signal quality by the base station.

305: The second base station sends, on the pilot port of the coordinating cell, the channel state information-reference signal of the target cell to the terminal based on the target time-frequency resource location.

The second base station sends, to the terminal on the (S-A) pilot ports of the coordinating cell, the CSI-RS in the target time-frequency resource of the target cell, namely, the CSI-RS of the target cell. The target time-frequency resource location is indicated by the CSI-RS configuration index of the target cell.

For example, a total quantity of the target pilot ports is 8 (S=8), and port numbers are sequentially 0 to 7. When joint transmission is performed by two cells, in other words, there is one coordinating cell, the first base station sends, on pilot ports whose port numbers are 0 to 3, CSI-RSs of the target cell to the terminal, and the second base station sends, on pilot ports whose port numbers are 4 to 7, CSI-RSs of the target cell to the terminal.

When joint transmission is performed by a plurality of cells, in other words, there are at least two coordinating cells, using two coordinating cells (a coordinating cell 1 and a coordinating cell 2) as an example, the first base station still sends, on the pilot ports whose port numbers are 0 to 3, CSI-RSs of the target cell to the terminal, and the second base station sends, on the pilot ports whose port numbers are 4 to 7, CSI-RSs of the target cell to the terminal, where pilot ports whose port numbers are 4 and 5 correspond to the coordinating cell 1, and pilot ports whose port numbers are 6 and 7 correspond to the coordinating cell 2.

306: The terminal performs channel measurement based on the channel state information-reference signal of the target cell, to obtain channel state information of the target cell.

The terminal performs the channel measurement based on the received CSI-RS of the target cell, to obtain the channel state information CSI of the target cell. The CSI includes a channel quality indication (CQI), a channel rank indication (RI), and a precoding matrix indication (PMI). The CQI is a fixed table in LTE, and usually, a higher SINR indicates a higher CQI order and a higher user rate. The PMI is calculated by the terminal through the channel measurement, and is fed back to the base station; and the base station performs transmission precoding by using the PMI, to better perform matching between the PMI and a channel and obtain a precoding gain. The RI indicates a quantity of multiplexed streams supported by a channel.

Optionally, the first base station configures a transmission mode of the terminal as TM9. Because a quantity of ports in the PMI measured by the terminal is the same as a quantity of NZP CSI-RS ports configured for the terminal, and the PMI is weighted to a PDSCH of TM9, a quantity of ports used for sending the PDSCH is the same as the quantity of NZP CSI-RS ports configured for the terminal.

307: The terminal sends the channel state information of the target cell to the first base station.

The terminal reports the CSI of the target cell to the first base station, and the CSI includes the CQI, the PMI, and the RI.

308: The first base station sends a second notification message to the second base station based on the channel state information of the target cell.

The first base station determines, based on the CQI, the PMI, and the RI that are fed back by the terminal, a modulation and coding scheme (MCS), a rank, and a PMI of the PDSCH channel sent to the terminal, and the first base station sends, to the second base station, the second notification message that carries the MCS, the rank, the PMI, and downlink data information.

309: The first base station sends a downlink data signal of the target cell to the terminal based on the channel state information of the target cell.

The first base station determines, based on the CQI, the PMI, and the RI that are fed back by the terminal, the MCS, the RANK, and the PMI of the PDSCH channel sent to the terminal, and sends, on A data ports, the PDSCH channel that carries the downlink data information. The A data ports have a one-to-one correspondence with the A pilot ports of the target cell, and a data port and a corresponding pilot port correspond to a same physical antenna.

Optionally, a transmission mode of the PDSCH channel is TM9. It can be learned from the description in step 306 that the quantity of ports used for sending the PDSCH of TM9 is the same as the quantity of NZP CSI-RS ports configured for the terminal, and it can be learned from step 302 that the quantity of NZP CSI-RS ports configured for the terminal is the same as the quantity S of the target pilot ports. Therefore, the first base station sends, to the terminal on the A pilot ports of the target cell, the PDSCH of TM9.

Optionally, the first base station sends, to the terminal, a PDCCH corresponding to the PDSCH of TM9, where the PDCCH is used to carry downlink control information for assisting in demodulating the downlink data information.

310: The second base station sends a downlink data signal of the target cell to the terminal based on the channel state information-reference signal of the target cell.

After the second base station receives the second notification message sent by the first base station, the second base station generates a PDSCH channel based on the MCS, the RANK, and the PMI that are carried in the second notification message, adds the downlink data information to the PDSCH channel, and sends, on (S-A) data ports, the PDSCH channel to the terminal. A pilot port and a corresponding data port correspond to a same physical antenna.

Optionally, similar to the description about the TM9 part in step 309, the second base station sends, on the (S-A) pilot ports of the coordinating cell, the PDSCH of TM9 to the terminal.

A sending manner in which the first base station and the second base station send the downlink control information of the target cell to the terminal in step 309 and step 310 is similar to the sending manner in which the CSI-RS of the target cell is sent in step 305. For description of the sending manner in step 309 and step 310, refer to related descriptions in step 305. Details are not described herein again.

In this embodiment, the first base station and the second base station separately send the CSI-RSs to the terminal on the pilot ports of the target cell and the coordinating cell according to an instruction of the same CSI-RS configuration index, to implement joint transmission performed by the target cell and the coordinating cell by using a joint channel, so that the target terminal obtains more accurate channel state information through measurement, and obtains a larger coherent transmission gain. The transmit weight PMI fed back based on the CSI-RSs sent by using the joint channel is weighted to the PDSCH of TM9, so that when PDSCHs sent by the first base station and the second base station arrive at the terminal, the PDSCHs of the first base station and the second base station have a same phase. Therefore, phase superimposition may be performed to enhance signal strength, and signal strength of a received signal of the terminal is improved.

To facilitate understanding of the signal sending method in this embodiment of this application, the following provides detailed descriptions with reference to a specific application scenario.

Figure 3B:
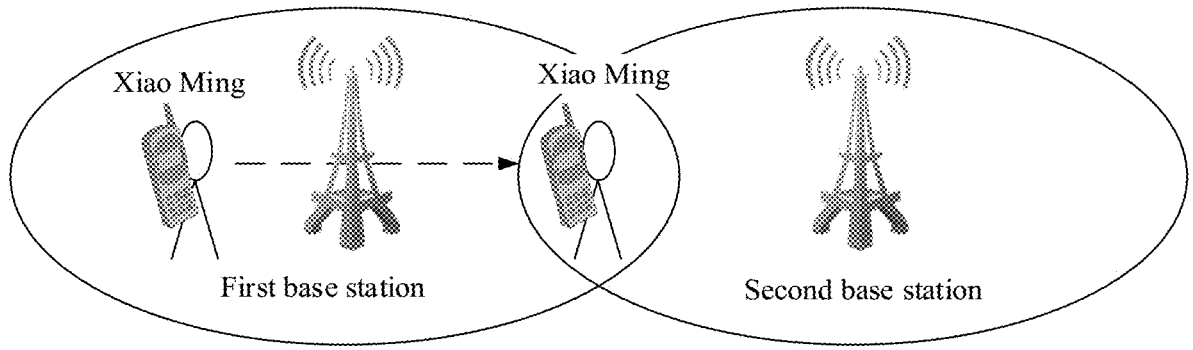
FIG. 3(b) is a schematic diagram of an application scenario of a signal sending method according to an embodiment of this application.

Application scenario 1: As shown in FIG. 3(*b*), Xiao Ming uses a mobile phone to make a call with another person. When the call starts, Xiao Ming makes the call within a service range of the first base station, and a voice service is performed between the mobile phone and the first base station. Xiao Ming moves in a direction of an arrow in the figure while making the call, and when Xiao Ming moves to an overlapping service area between the first base station and the second base station in the figure, because signal strength of the mobile phone is weak due to interference from the second base station and a long distance from the first base station, the mobile phone starts to detect, through measurement, that surrounding signal strength of the second base station is relatively strong, and sends an A3 measurement report to the first base station to request to be handed over. In this case, the first base station determines the mobile phone as a terminal, and the first base station sends a notification message to the second base station, to instruct the second base station to assist the first base station in sending voice signals to the mobile phone of Xiao Ming. After the first base station and the second base station complete information exchange for joint transmission, the first base station sends the voice signals to the mobile phone of Xiao Ming in coordination with the second base station, to enhance the signal strength of the mobile phone of Xiao Ming and ensure a normal call.

2. Both the target cell and the coordinating cell are within the coverage of the first base station.

Figure 4A:
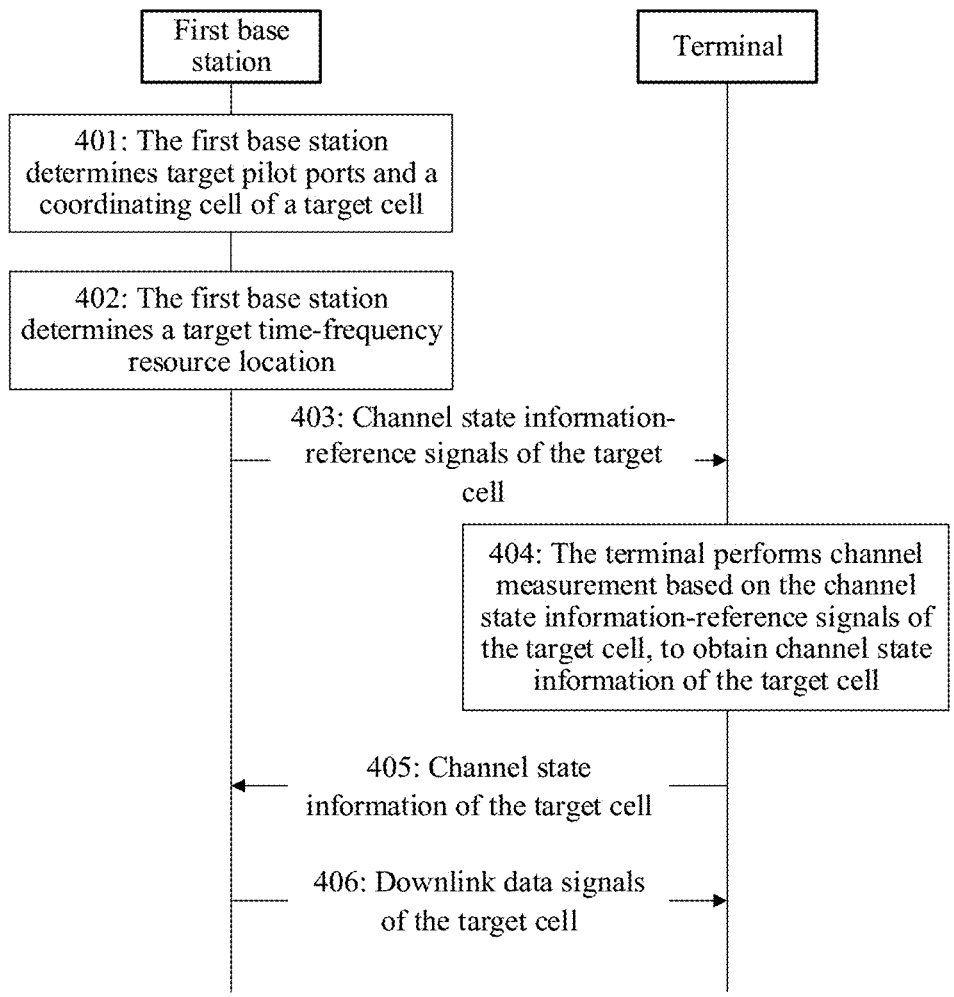
FIG. 4(a) is a schematic diagram of another embodiment of a signal sending method according to an embodiment of this application.
Figure 4B:
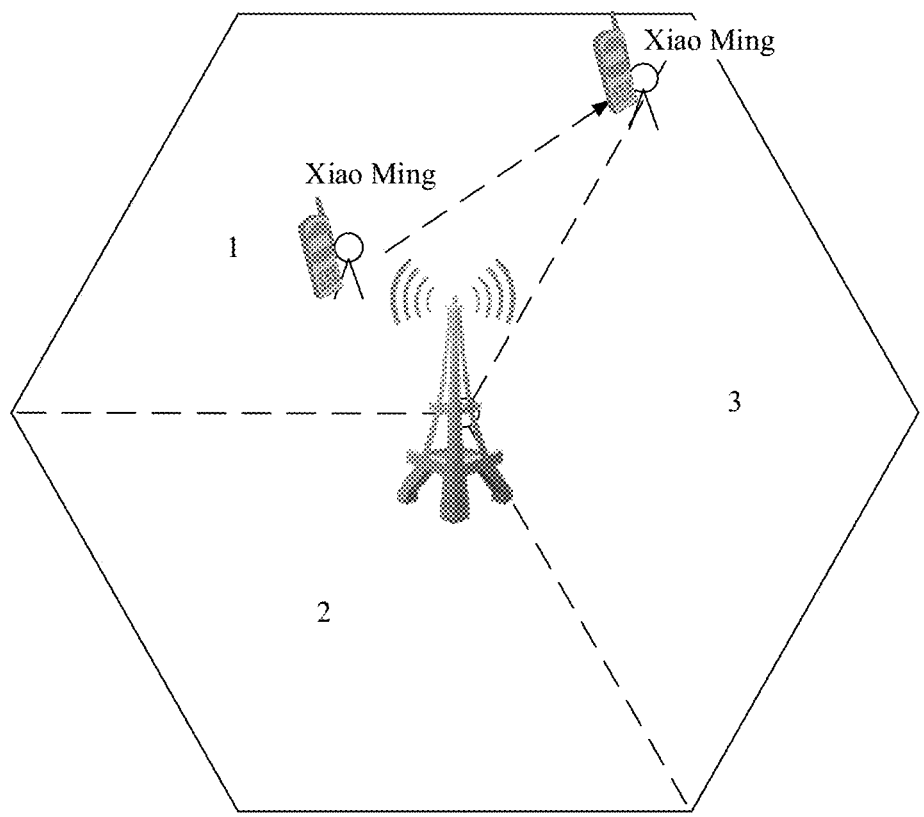
FIG. 4(b) is a schematic diagram of another application scenario of a signal sending method according to an embodiment of this application.

As shown in FIG. 4(*a*), another embodiment of a signal sending method according to an embodiment of this application includes the following steps.

401: A first base station determines target pilot ports and a coordinating cell of a target cell.

The first base station determines the target pilot ports used for joint transmission by the target cell and the coordinating cell, the target pilot ports include a pilot port of the target cell and a pilot port of the coordinating cell, and the target cell is a cell covered by the first base station.

The first base station uses one or more neighboring cells of the target cell as coordinating cells. For example, three neighboring sectors of a base station may be fixedly coordinating cells of each other.

402: The first base station determines a target time-frequency resource location.

Step 402 is similar to step 302. For detailed descriptions, refer to step 302. Details are not described herein again.

403: The first base station sends, on the pilot port of the target cell and the pilot port of the coordinating cell, channel state information-reference signals of the target cell to a terminal based on the target time-frequency resource location.

The first base station sends, to the terminal on A pilot ports of the target cell and (S-A) pilot ports of the coordinating cell, the CSI-RSs in the target time-frequency resource, namely, the CSI-RSs of the target cell, the target time-frequency resource location is indicated by the CSI-RS configuration index of the target cell.

Other related descriptions of step 403 are similar to the related descriptions of step 304 and step 305. For detailed descriptions, refer to the related descriptions of step 304 and step 305. Details are not described herein again.

Optionally, before step 403, the method further includes: The first base station uses a terminal with relatively weak signal strength at an edge position of the target cell and the coordinating cell as the terminal. A specific determining method thereof may also be based on an A3 measurement report reported by the terminal to the base station. For detailed descriptions, refer to related descriptions of the A3 measurement in step 304. Details are not described herein again.

404: The terminal performs channel measurement based on the channel state information-reference signals of the target cell, to obtain channel state information of the target cell.

405: The terminal sends the channel state information of the target cell to the first base station.

Step 404 and step 405 are respectively similar to step 306 and step 307. For detailed descriptions, refer to related descriptions of step 306 and step 307. Details are not described herein again.

406: The first base station sends downlink data signals of the target cell to the terminal based on the channel state information of the target cell.

Step 406 is similar to the related descriptions in step 309 and step 310. A difference lies in that, because the coordinating cell and the target cell are both within the coverage of the first base station, the first base station in step 406 needs to perform not only the operation of the first base station in step 309, but also the operation of the second base station in step 310. For related descriptions of other parts, refer to the foregoing step 309 and step 310. Details are not described herein again.

In this embodiment of this application, the target cell and the coordinating cell are covered by a same base station, and joint coherent transmission is performed by the target cell and the coordinating cell, so that when PDSCHs sent by using the pilot port of the target cell and the pilot port of the coordinating cell arrive at the terminal, the PDSCHs with a same phase may be superimposed with each other, to improve signal strength of received signals of the terminal and improve the downlink data transmission efficiency. To facilitate understanding of the signal sending method in this embodiment of this application, the following provides detailed descriptions with reference to a specific application scenario.

Application scenario 2: As shown in FIG. 4(*b*), a cell 1, a cell 2, and a cell 3 are three neighboring cells covered by a base station, and the three cells are coordinating cells of each other. Xiao Ming uses a mobile phone to make a call with another person. When the call starts, Xiao Ming is in a service range of the serving cell 1 of the base station, and voice transmission is performed between the serving cell 1 and the mobile phone. Xiao Ming moves towards an edge service area of the cell 3 and the cell 1 in a direction of an arrow in the figure while making the call, and finally continues to make the call at the position at the tail of the arrow. Because the position at which Xiao Ming stops is far away from the center of the base station, signal strength is weak. In this case, the cell 1 instructs the cell 3 to perform joint transmission to the mobile phone of Xiao Ming, and then the cell 1 coordinates with the cell 3 to jointly send voice signals to the mobile phone of Xiao Ming, to enhance the signal strength of the mobile phone of Xiao Ming and ensure a normal call.

In the foregoing embodiments, the signal sending methods in this application are described in detail from a perspective that the coordinating cell and the target cell are covered by a same base station or by different base stations. The following describes in detail the first base station, the second base station, and the terminal in this application. Details are as follows:

1. First Base Station

Figure 5:
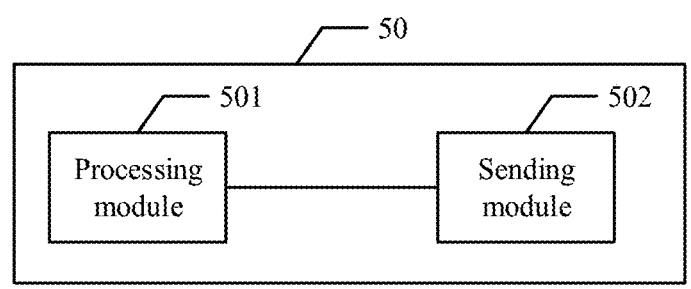
FIG. 5 is a schematic diagram of an embodiment of a first base station according to an embodiment of this application.

As shown in FIG. 5, a first base station 50 in an embodiment of this application includes:

a processing module 501, configured to determine target pilot ports and a coordinating cell of a target cell, where the coordinating cell is a cell that jointly sends, with the target cell, channel state information-reference signals CSI-RSs of the target cell, the target pilot ports are pilot ports used to jointly send the CSI-RSs of the target cell, and the target pilot ports include a pilot port of the target cell and a pilot port of the coordinating cell; and the processing module 501 is further configured to determine a resource location of a target time-frequency resource, where the target time-frequency resource is a time-frequency resource used to send the CSI-RSs of the target cell; and a sending module 502, configured to send, on the target pilot ports, the CSI-RSs of the target cell to a terminal based on the target time-frequency resource, where signal strength of the terminal is lower than a preset threshold.

The processing module 501 is specifically configured to:
determine a CSI-RS configuration index of the target cell based on a cell identifier of the target cell; and
determine the resource location of the target time-frequency resource based on the CSI-RS configuration index of the target cell.

The sending module 502 is further configured to:
send CSI-RS configuration information to the terminal, where the CSI-RS configuration information is used to indicate: a non-zero power CSI-RS configuration index of the terminal is the CSI-RS configuration index of the target cell, and a zero power CSI-RS configuration index of the terminal is an index indicating following three types of CSI-RS resource elements REs: an RE of a non-zero power CSI-RS of the terminal, an RE of a CSI-RS jointly delivered by the target cell for another target cell, and an RE of a CSI-RS jointly delivered by the coordinating cell for another target cell.

Figure 6:
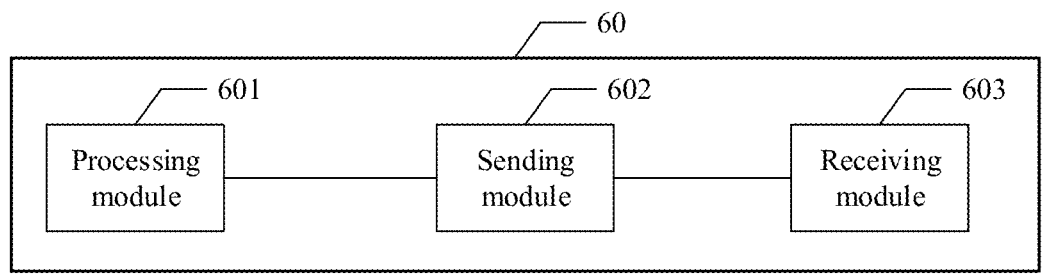
FIG. 6 is a schematic diagram of another embodiment of a first base station according to an embodiment of this application.

As shown in FIG. 6, in an example, the coordinating cell is a cell covered by the first base station, and a total quantity of the target pilot ports is S, where a quantity of pilot ports of the target cell is A, a quantity of pilot ports of the coordinating cell is (S-A), S is a positive integer not less than 2, and A is a positive integer not less than 1 and less than S; and the processing module 601 is specifically configured to:
send, on the A pilot ports of the target cell and the (S-A) pilot ports of the coordinating cell, the CSI-RSs of the target cell to the terminal based on the target time-frequency resource.

Based on the foregoing example in which the coordinating cell is a cell covered by the first base station, in another example, as shown in FIG. 6, the first base station 60 further includes:
- a receiving module 603, configured to receive channel state information CSI of the target cell that is sent by the terminal; and
- the sending module 602 is further configured to:
- send, on S data ports, downlink data signals of the target cell to the terminal based on the CSI of the target cell, where A data ports of the S data ports have a one-to-one correspondence with the A pilot ports of the target cell, and (S-A) data ports of the S data ports have a one-to-one correspondence with the (S-A) pilot ports of the coordinating cell.

As shown in FIG. 6, in another example, the coordinating cell is a cell covered by a second base station, the second base station is a base station whose coverage overlaps coverage of the first base station, and a total quantity of the target pilot ports is S, where a quantity of pilot ports of the coordinating cell is (S-A), S is a positive integer not less than 2, and A is a positive integer not less than 1 and less than S;
- the sending module 602 is further configured to:
- send a first notification message to the second base station, where the first notification message carries a cell identifier of the coordinating cell; and
- the processing module 601 is specifically configured to:
- send, on the A pilot ports of the target cell, the CSI-RS of the target cell to the terminal based on the target time-frequency resource.

Based on the foregoing example in which the coordinating cell is a cell covered by the second base station, in still another example, the first base station 60 further includes:
- a receiving module 603, configured to receive CSI of the target cell that is sent by the terminal; and
- the sending module 602 is further configured to:
- send a second notification message to the second base station, where the second notification message carries the CSI of the target cell and a downlink data signal of the target cell, so that the second base station sends, on (S-A) data ports, the downlink data signal of the target cell to the terminal based on the CSI of the target cell, where the (S-A) data ports have a one-to-one correspondence with the (S-A) pilot ports of the coordinating cell; and
- send, on A data ports, a downlink data signal of the target cell to the terminal based on the CSI of the target cell, where the A data ports have a one-to-one correspondence with the A pilot ports of the target cell.

It should be noted that the first base station separately uses reference numeral 50 and 60, which are merely used to distinguish whether the first base station is the first base station shown in FIG. 5 or the first base station is shown in FIG. 6. There is no other difference. In the embodiments corresponding to the second base station and the terminal, 50 is used to identify the first base station. Details are not described below again.

Figure 9:
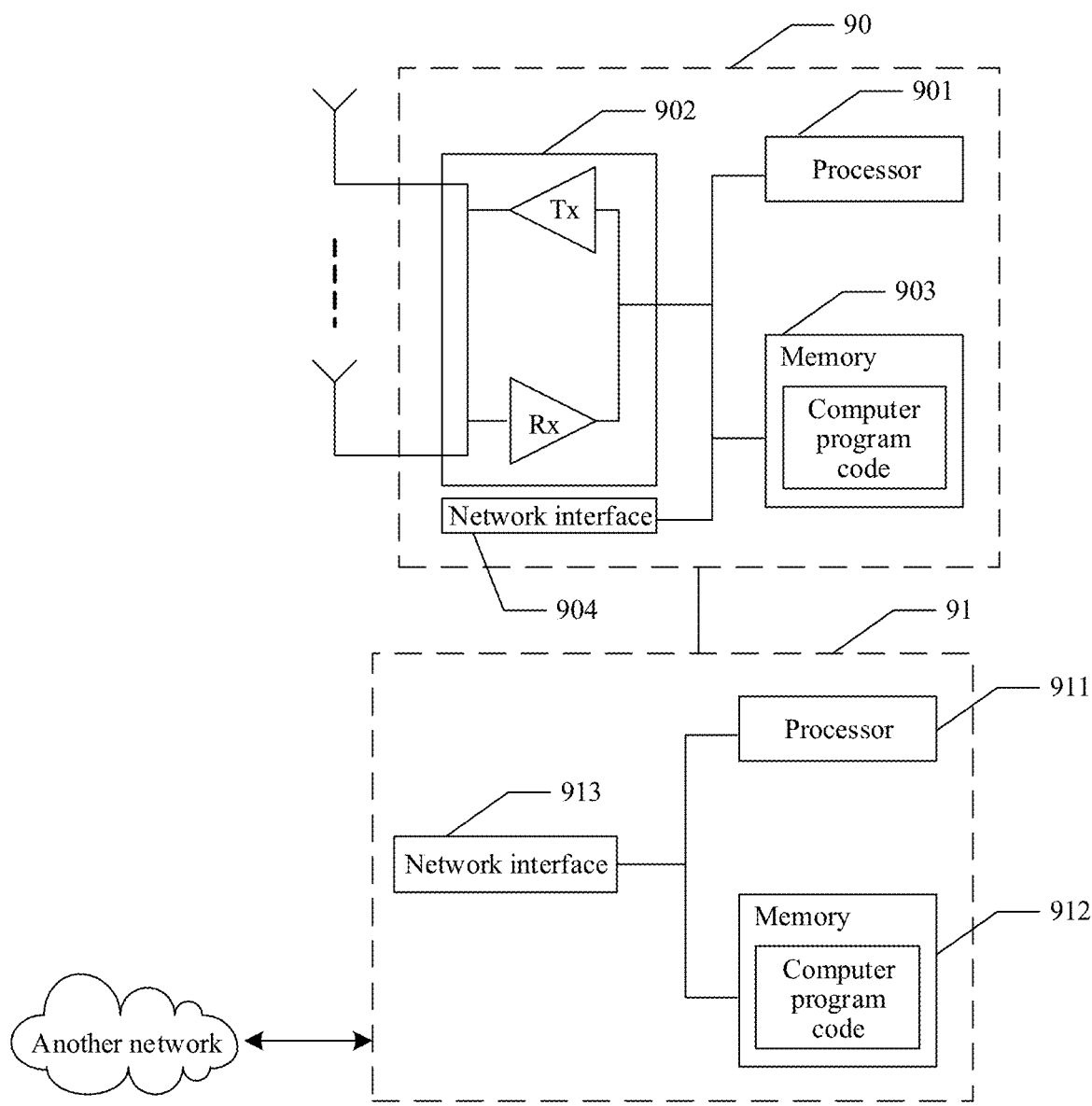
FIG. 9 is a schematic diagram of a hardware structure of a first base station according to an embodiment of this application.

The processing module 501 (or 601) may be specifically a processor 901 shown in FIG. 9, and the sending module 502 (or 602) and the receiving module 603 may be specifically a transceiver 902 shown in FIG. 9.

In this embodiment, for other related descriptions and beneficial effects of the first base station, refer to the embodiments corresponding to FIG. 3(*a*) and FIG. 4(*a*). Related descriptions of the first base station are not described in detail herein again.

2. Second Base Station

Figure 7:
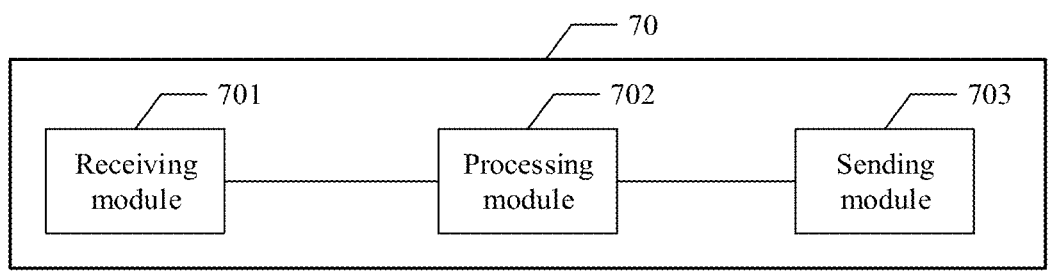
FIG. 7 is a schematic diagram of an embodiment of a second base station according to an embodiment of this application.

As shown in FIG. 7, a second base station 70 in an embodiment of this application includes:
- a receiving module 701, configured to receive a first notification message sent by a first base station, where the first notification message carries a cell identifier of a coordinating cell, and the first base station is a base station whose coverage overlaps coverage of the second base station;
- a processing module 702, configured to determine a resource location of a target time-frequency resource and a pilot port of the coordinating cell based on the cell identifier of the coordinating cell, where the target time-frequency resource is a time-frequency resource used to send a channel state information-reference signal CSI-RS of a target cell, the target cell is a cell covered by the first base station, a quantity of pilot ports of the coordinating cell is (S-A), S is a positive integer not less than 2, and A is a positive integer not less than 1 and less than S; and
- a sending module 703, configured to send, on the (S-A) pilot ports of the coordinating cell, the CSI-RS of the target cell to a terminal based on the target time-frequency resource, where signal strength of the terminal is lower than a preset threshold.

In an example, the receiving module 701 is further configured to:
- receive a second notification message sent by the first base station, where the second notification message carries channel state information CSI of the target cell and a downlink data signal of the target cell; and
- the sending module is further configured to:
- send, on (S-A) data ports, the downlink data signal of the target cell to the terminal based on the CSI of the target cell, where the (S-A) data ports have a one-to-one correspondence with the (S-A) pilot ports of the coordinating cell.

Figure 10:
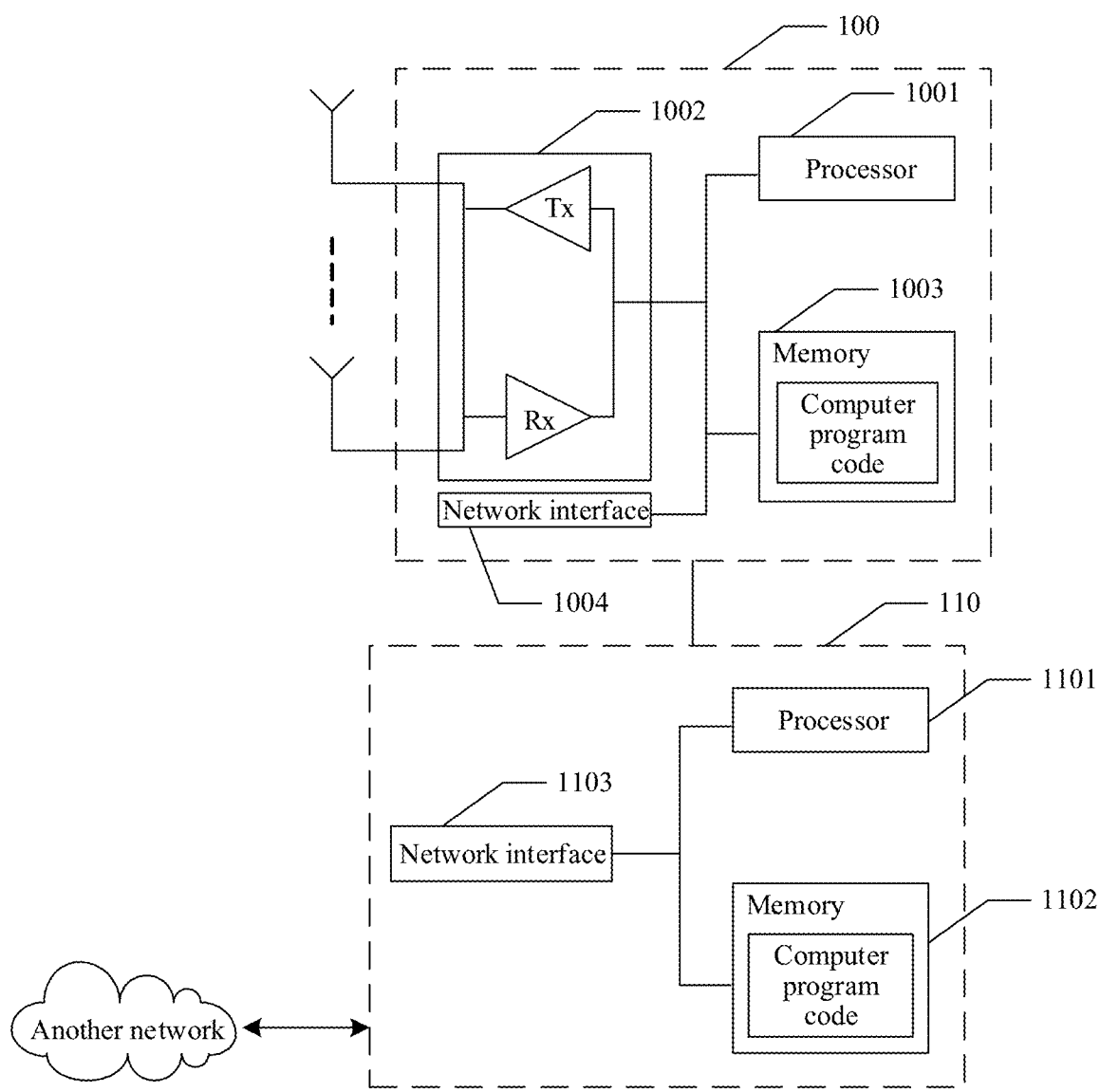
FIG. 10 is a schematic diagram of a hardware structure of a second base station according to an embodiment of this application.

The processing module 702 may be specifically a processor 1001 shown in FIG. 10, and the receiving module 701 and the sending module 703 may be specifically a transceiver 1002 shown in FIG. 10.

In this embodiment, for other related descriptions and beneficial effects of the second base station, refer to the embodiments corresponding to FIG. 3(*a*) and FIG. 4(*a*). Related descriptions of the second base station are not described in detail herein again.

3. Terminal

Figure 8:
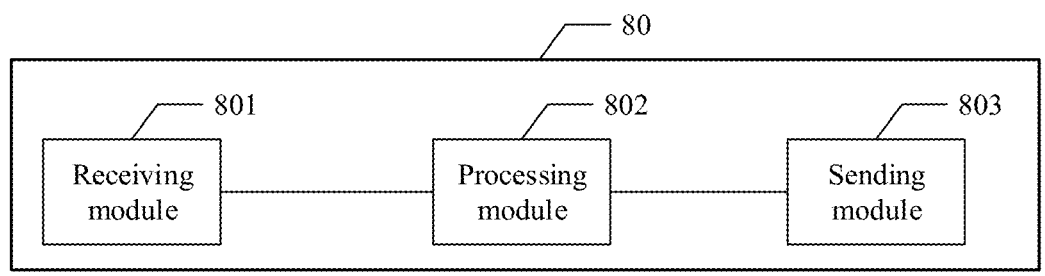
FIG. 8 is a schematic diagram of an embodiment of a terminal according to an embodiment of this application.

As shown in FIG. 8, a terminal 80 in an embodiment of this application includes:
- a receiving module 801, configured to receive channel state information-reference signals CSI-RSs of a target cell, where the CSI-RSs of the target cell are carried on a target time-frequency resource and are sent to the terminal by using target pilot ports, the target pilot ports include a pilot port of the target cell and a pilot port of a coordinating cell, the coordinating cell is a cell that jointly sends, with the target cell, the CSI-RSs of the target cell, and signal quality strength of the terminal is lower than a preset threshold;
- a processing module 802, configured to obtain channel state information CSI of the target cell based on the CSI-RSs of the target cell; and
- a sending module 803, configured to send the CSI of the target cell to a first base station.

In an example, the receiving module 801 is further configured to:

receive CSI-RS configuration information sent by the first base station, where the CSI-RS configuration information is used to indicate: a non-zero power channel state information-reference signal CSI-RS configuration index of the terminal is a CSI-RS configuration index of the target cell, where the CSI-RS configuration index of the target cell is used to determine the target time-frequency resource, and the CSI-RS configuration index of the target cell is determined based on a cell identifier of the target cell; a zero power CSI-RS configuration index of the terminal is an index indicating following three types of CSI-RS resource elements REs: an RE of a non-zero power CSI-RS of the terminal, an RE of a CSI-RS jointly delivered by the target cell for another target cell, and an RE of a CSI-RS jointly delivered by the coordinating cell for another target cell.

Figure 11:
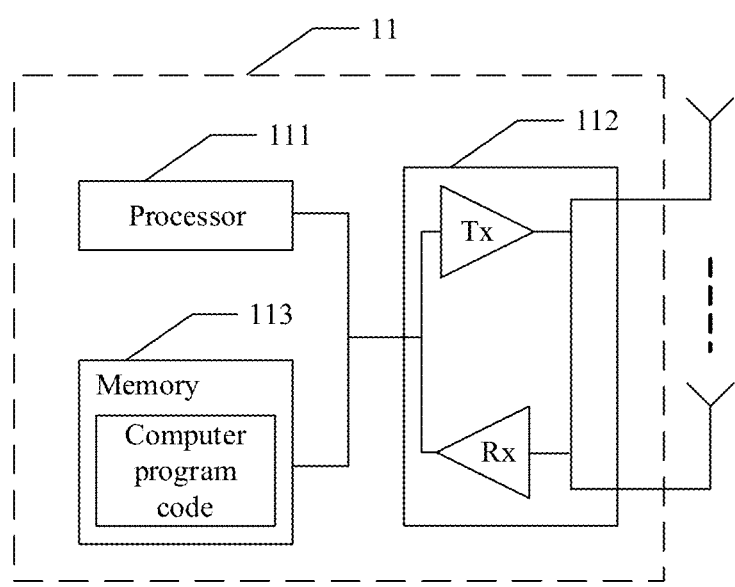
FIG. 11 is a schematic diagram of a hardware structure of a terminal according to an embodiment of this application.

The processing module 802 may be specifically a processor 111 shown in FIG. 11, and the receiving module 801 and the sending module 803 may be specifically a transceiver 112 shown in FIG. 11.

In this embodiment, for other related descriptions and beneficial effects of the terminal, refer to the embodiments corresponding to FIG. 3(*a*) and FIG. 4(*a*). Related descriptions of the terminal are not described in detail herein again.

The following separately describes the first base station, the second base station, and the terminal in detail with reference to hardware structures of the first base station, the second base station, and the terminal. Details are as follows:

As shown in FIG. 9, a first base station 90 includes:
a transceiver 902, a processor 901, a memory 903, and a network interface 904.

The first base station 90 provides wireless access from UE to a network, and includes one or more processors 901, one or more memories 903, one or more network interfaces 904, and one or more transceivers 902 (each transceiver includes a receiver Rx and a transmitter Tx) that are connected by using a bus. The one or more transceivers 902 are connected to an antenna or an antenna array. The one or more processors 901 include computer program code or a computer operation instruction. The network interface 904 is connected to a core network device 91 by using a link (for example, a link between the network interface 904 and a core network), or is connected to another base station (for example, a second base station 100) by using a wired or wireless link.

In this embodiment, the processor 901 invokes the computer program code or the computer operation instruction stored in the memory 902, to perform related operations of the first base station in FIG. 3(*a*) and FIG. 4(*a*). For detailed descriptions, refer to related descriptions of the first base station in the embodiments corresponding to FIG. 3(*a*) and FIG. 4(*a*). Details are not described herein again.

The network may further include the core network device 91, for example, a network control unit (network control equipment, NCE), a mobility management entity (MME), or a signaling gateway (SGW), and may further provide a network connection, for example, a connection to a telephone network and/or a data communications network (for example, the internet). The first base station 90 may be connected to the core network device 91 by using a link (for example, an S1 interface). The core network device 91 includes one or more processors 911, one or more memories 912, and one or more network interfaces 913 that are connected by using a bus. The one or more memories 912 include computer program code or a computer operation instruction.

An embodiment of this application further provides a computer storage medium, configured to store a computer software instruction used by the foregoing first base station. When the computer software instruction is run on a computer, the computer is enabled to perform the signal sending method performed by the first base station 90. The storage medium may be specifically the memory 912.

An embodiment of this application further provides a computer program product including an instruction. When the computer program product is run on a computer, the computer is enabled to perform the signal sending method performed by the first base station.

As shown in FIG. 10, a second base station 100 includes:
a transceiver 1002, a processor 1001, a memory 1003, and a network interface 1004.

The second base station 100 provides wireless access from UE to a network, and includes one or more processors 1001, one or more memories 1003, one or more network interfaces 1004, and one or more transceivers 1002 (each transceiver includes a receiver Rx and a transmitter Tx) that are connected by using a bus. The one or more transceivers 1002 are connected to an antenna or an antenna array. The one or more processors 1001 include computer program code or a computer operation instruction. The network interface 1004 is connected to a core network device 110 by using a link (for example, a link between the network interface 1004 and a core network), or is connected to another base station (for example, a first base station 90) by using a wired or wireless link.

In this embodiment, the processor 1001 invokes the computer program code or the computer operation instruction stored in the memory 1002, to perform related operations of the second base station in FIG. 4(*a*). For detailed descriptions, refer to related descriptions of the second base station in the embodiment corresponding to FIG. 4(*a*). Details are not described herein again.

The network may further include the core network device 110, for example, a network control unit (network control equipment, NCE), a mobility management entity (MME), or a signaling gateway (SGW), and may further provide a network connection, for example, a connection to a telephone network and/or a data communications network (for example, the internet). The second base station 100 may be connected to the core network device 110 by using a link (for example, an S1 interface). The core network device 110 includes one or more processors 1101, one or more memories 1102, and one or more network interfaces 1103 that are connected by using a bus. The one or more memories 1102 include computer program code or a computer operation instruction.

An embodiment of this application further provides a computer storage medium, configured to store a computer software instruction used by the foregoing second terminal. When the computer software instruction is run on a computer, the computer is enabled to perform the signal sending method performed by the second base station 100. The storage medium may be specifically the memory 1002.

An embodiment of this application further provides a computer program product including an instruction. When the computer program product is run on a computer, the computer is enabled to perform the signal sending method performed by the terminal.

As shown in FIG. 11, a terminal 11 includes:
a processor 111, a transceiver 112, and a memory 113.

The terminal 11 is referred to as UE 11, and performs wireless communication with a base station by using a link. The UE 11 includes one or more processors 111, one or more memories 113, and one or more transceivers 112 (each transceiver includes a transmitter Tx and a receiver Rx) that are connected by using a bus. The one or more transceivers 112 are connected to one or more antennas. The one or more memories 113 include computer program code or a computer operation instruction.

In this embodiment, the processor 111 invokes the computer program code or the computer operation instruction stored in the memory 113, to perform related operations of the terminal in FIG. 3(a) and FIG. 4(a). For detailed descriptions, refer to related descriptions of the terminal in the embodiments corresponding to FIG. 3(a) and FIG. 4(a). Details are not described herein again.

An embodiment of this application further provides a computer storage medium, configured to store a computer software instruction used by the foregoing terminal. When the computer software instruction is run on a computer, the computer is enabled to perform the signal sending method performed by the terminal 11. The storage medium may be specifically the memory 113.

An embodiment of this application further provides a computer program product including an instruction. When the computer program product is run on a computer, the computer is enabled to perform the signal sending method performed by the terminal.

An embodiment of this application further provides a communications apparatus. The communications apparatus includes a processing element and a storage element. The storage element is configured to store a computer program, and when the processing element invokes the computer program, the communications apparatus is configured to perform the operations performed by the terminal, the first base station, or the second base station in the foregoing signal sending method embodiments.

The base station may be any base station mentioned above, or the UE may be any terminal mentioned above. This is not limited herein.

The memories included in the UE, the base station, and the core network device may be of a type suitable for any local technology environment, and may be implemented by using any suitable data storage technology.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like. It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A signal sending method, comprising:
   determining, by a first base station, target pilot ports and a coordinating cell of a target cell, wherein the target cell is a serving cell of a terminal, the coordinating cell is a cell that jointly sends, with the target cell, a channel state information-reference signal (CSI-RS) of the target cell, the target pilot ports are pilot ports used to jointly send the CSI-RS of the target cell, and the target pilot ports comprise a pilot port of the target cell and a pilot port of the coordinating cell;
   determining, by the first base station, a resource location of a target time-frequency resource, wherein the target time-frequency resource is a time-frequency resource used to send the CSI-RS of the target cell; and
   sending, by the first base station on the pilot port of the target cell, the CSI-RS of the target cell to the terminal based on the target time-frequency resource, wherein signal strength of a downlink signal of the terminal is lower than a preset threshold;
   wherein a total quantity of the target pilot ports is S, a quantity of pilot ports of the target cell is A, a quantity of pilot ports of the coordinating cell is S-A, S is a positive integer not less than 2, and A is a positive integer no less than 1 and less than S; and
   wherein the sending, by the first base station on the target pilot ports of the target cell, the CSI-RS of the target cell to the terminal based on the target-frequency resource comprises:
   sending, on the A pilot ports of the target cell and the S-A pilot ports of the coordinating cell, the CSI-RS of the target cell to the terminal based on the target-frequency resource.

2. The method according to claim 1, wherein the determining, by the first base station, the resource location of the target time-frequency resource comprises:
   determining, by the first base station, a CSI-RS configuration index of the target cell based on a cell identifier of the target cell; and
   determining, by the first base station, the resource location of the target time-frequency resource based on the CSI-RS configuration index of the target cell; and
   after the determining, by the first base station, the CSI-RS configuration index of the target cell based on the cell identifier of the target cell, the method further comprises:
   sending, by the first base station, CSI-RS configuration information to the terminal, wherein the CSI-RS configuration information is used to indicate: a non-zero power CSI-RS configuration index of the terminal is the CSI-RS configuration index of the target cell, and a zero power CSI-RS configuration index of the terminal is an index indicating one of the following three types of CSI-RS resource elements (Res): an RE of a non-zero power CSI-RS of the terminal, an RE of a CSI-RS delivered by the target cell for another target cell, and an RE of a CSI-RS delivered by the coordinating cell for another target cell.

3. The method according to claim 1, wherein the coordinating cell is a cell covered by the first base station; and
   wherein the sending, by the first base station on the pilot port of the target cell, the CSI-RS of the target cell to the terminal based on the target time-frequency resource comprises:
   sending, by the first base station on the A pilot ports of the target cell and the S-A pilot ports of the coordinating cell, the CSI-RS of the target cell to the terminal based on the target time-frequency resource.

4. The method according to claim 3, wherein after the sending, by the first base station on the A pilot ports of the target cell and the SA pilot ports of the coordinating cell, the CSI-RS of the target cell to the terminal based on the target time-frequency resource, the method further comprises:
   receiving, by the first base station, channel state information (CSI) of the target cell that is sent by the terminal; and
   sending, by the first base station on S data ports, downlink data signals of the target cell to the terminal based on the CSI of the target cell, wherein A data ports of the S data ports have a one-to-one correspondence with the A pilot ports of the target cell, and SA data ports of the S data ports have a one-to-one correspondence with the S-A pilot ports of the coordinating cell, wherein a data port and a corresponding pilot port correspond to the same physical antenna.

5. The method according to claim 1, wherein the coordinating cell is a cell covered by a second base station, the second base station is a base station whose coverage overlaps coverage of the first base station;
   wherein before the sending, by the first base station on the pilot port of the target cell, the CSI-RS of the target cell to the terminal based on the target time-frequency resource, the method further comprises:
   sending, by the first base station, a first notification message to the second base station, wherein the first notification message carries a cell identifier of the coordinating cell; and
   wherein the sending, by the first base station on the pilot port of the target cell, the CSI-RSs of the target cell to the terminal based on the target time-frequency resource comprises:
   sending, by the first base station on the A pilot ports of the target cell, the CSI-RS of the target cell to the terminal based on the target time-frequency resource.

6. The method according to claim 5, wherein after the sending, by the first base station on the A pilot ports of the target cell, the CSI-RS of the target cell to the terminal based on the target time-frequency resource, the method further comprises:
   receiving, by the first base station, CSI of the target cell that is sent by the terminal;
   sending, by the first base station, a second notification message to the second base station, wherein the second notification message carries the CSI of the target cell and a downlink data signal of the target cell, so that the second base station sends, on S-A data ports, the downlink data signal of the target cell to the terminal based on the CSI of the target cell, wherein the S-A data ports have a one-to-one correspondence with the (S-A) pilot ports of the coordinating cell; and
   sending, by the first base station on A data ports, a downlink data signal of the target cell to the terminal based on the CSI of the target cell, wherein the A data ports have a one-to-one correspondence with the A pilot ports of the target cell, wherein a data port and a corresponding pilot port correspond to the same physical antenna.

7. A signal sending method, comprising:
   receiving, by a second base station, a first notification message sent by a first base station, wherein the first notification message carries a cell identifier of a coordinating cell of the first base station, and the first base station is a base station whose coverage overlaps coverage of the second base station;

determining, by the second base station, a resource location of a target time-frequency resource and a pilot port of the coordinating cell based on the cell identifier of the coordinating cell, wherein the target time-frequency resource is a time-frequency resource used to send a channel state information-reference signal (CSI-RS) of a target cell, the target cell is a serving cell of a terminal, the target cell is a cell covered by the first base station, a quantity of pilot ports of the coordinating cell is S-A, S is a positive integer not less than 2, and A is a positive integer not less than 1 and less than S; and sending, by the second base station on the S-A pilot ports of the coordinating cell, the CSI-RS of the target cell to the terminal based on the target time-frequency resource, wherein signal strength of a downlink signal of the terminal is lower than a preset threshold.

8. The method according to claim 7, wherein after the sending, by the second base station on the S-A pilot ports of the coordinating cell, the CSI-RS of the target cell to the terminal based on the target time-frequency resource, the method further comprises:

receiving, by the second base station, a second notification message sent by the first base station, wherein the second notification message carries channel state information (CSI) of the target cell and a downlink data signal of the target cell; and sending, by the second base station on S-A data ports, the downlink data signal of the target cell to the terminal based on the CSI of the target cell, wherein the S-A data ports have a one-to-one correspondence with the S-A pilot ports of the coordinating cell, wherein a data port and a corresponding pilot port correspond to the same physical antenna.

9. A signal sending method, comprising:

receiving, by a terminal, a channel state information-reference signal (CSI-RS) of a target cell, wherein the target cell is a serving cell of the terminal, the CSI-RS of the target cell is carried on a target time-frequency resource and is sent to the terminal by using target pilot ports, the target pilot ports comprise a pilot port of the target cell and a pilot port of a coordinating cell, the coordinating cell is a cell that jointly sends, with the target cell, the CSI-RS of the target cell, and signal strength of a downlink signal of the terminal is lower than a preset threshold;

obtaining, by the terminal, channel state information (CSI) of the target cell based on the CSI-RS of the target cell; and sending, by the terminal, the CSI of the target cell to a first base station;

wherein a total quantity of the target pilot ports is S, a quantity of pilot ports of the target cell is A, a quantity of pilot ports of the coordinating cell is S-A, S is a positive integer not less than 2, and A is a positive integer no less than 1 and less than S; and wherein the receiving, by the terminal, the CSI-RS of the target cell to the terminal on the target-frequency resource comprises:

receiving, on the A pilot ports of the target cell and the S-A pilot ports of the coordinating cell, the CSI-RS of the target cell on the target-frequency resource.

10. The method according to claim 9, wherein before the receiving, by the terminal, the CSI-RS of the target cell, the method further comprises:

receiving, by the terminal, CSI-RS configuration information sent by the first base station, wherein the CSI-RS configuration information is used to indicate: a non-zero power CSI-RS configuration index of the terminal is a CSI-RS configuration index of the target cell, wherein the CSI-RS configuration index of the target cell is used to determine the target time-frequency resource, and the CSI-RS configuration index of the target cell is determined based on a cell identifier of the target cell; and a zero power CSI-RS configuration index of the terminal is an index indicating one of the following three types of CSI-RS resource elements (Res): an RE of a non-zero power CSI-RS of the terminal, an RE of a CSI-RS jointly delivered by the target cell for another target cell, and an RE of a CSI-RS jointly delivered by the coordinating cell for another target cell.

* * * * *

UNITED STATES PATENT AND TRADEMARK OFFICE
CERTIFICATE OF CORRECTION

| | |
|---|---|
| PATENT NO. | : 11,394,444 B2 |
| APPLICATION NO. | : 16/942280 |
| DATED | : July 19, 2022 |
| INVENTOR(S) | : Li et al. |

It is certified that error appears in the above-identified patent and that said Letters Patent is hereby corrected as shown below:

In the Claims

Claim 4: Column 26, Line 5: "target cell and the SA pilot ports of the coordinating cell, the" should read -- target cell and the S-A pilot ports of the coordinating cell, the --.

Claim 4: Column 26, Line 15: "pilot ports of the target cell, and SA data ports of the S" should read -- pilot ports of the target cell, and S-A data ports of the S --.

Signed and Sealed this
Fifteenth Day of November, 2022

Katherine Kelly Vidal
*Director of the United States Patent and Trademark Office*